United States Patent [19]
White, Jr.

[11] 3,785,661
[45] Jan. 15, 1974

[54] HIGH PRESSURE ROTARY SEAL BACKUP
[75] Inventor: Hollis N. White, Jr., Lafayette, Ind.
[73] Assignee: TRW Inc., Cleveland, Ohio
[22] Filed: Sept. 21, 1972
[21] Appl. No.: 290,779

[52] U.S. Cl. .............................. 277/188, 308/187.1
[51] Int. Cl. ............................................ F16j 15/54
[58] Field of Search ................. 308/187.1; 277/188, 277/181

[56] References Cited
UNITED STATES PATENTS

| | | | |
|---|---|---|---|
| 2,856,249 | 10/1958 | Leman | 277/180 |
| 2,926,976 | 3/1960 | Bowerman et al. | 277/188 |
| 3,029,083 | 4/1962 | Wilde | 277/181 |
| 3,565,446 | 2/1971 | Nyberg | 277/188 |
| 3,627,336 | 12/1971 | Lawson | 277/188 |
| 3,668,446 | 6/1972 | Hoyler | 308/187.1 |

*Primary Examiner*—William T. Dixson, Jr.
*Assistant Examiner*—Robert I. Smith
*Attorney*—Benjamin H. Sherman et al.

[57] ABSTRACT

A hydraulic motor-pump assembly having an axial chamber formed therein, a pair of relatively rotationally and orbitally movable gear members disposed within the chamber, forming expanding and contracting fluid pockets between the teeth thereof and various fluid ports and passages for directing fluid, under relatively high pressure, through the housing and to and from the respective fluid pockets in synchronism with the relative movement of the gear members, and a work input-output shaft being connected by a wobble shaft, to one of the gear members for joint rotation with successive gear members, whereby the input-output shaft is subjected to operating forces tending to impart eccentric movement thereto, a fluid sealing structure being disposed at the input-output shaft and comprising a relatively resilient sealing ring, subjected at one side thereof to the relatively high fluid pressure in said chamber, with such sealing ring being backed at the low pressure side by a pair of cooperable members, one of which has a relatively minimum clearance with respect to the adjacent portion of the housing whereby said resilient sealing ring is operatively backed at the low pressure side thereof substantially through its radial area.

14 Claims, 2 Drawing Figures

HIGH PRESSURE ROTARY SEAL BACKUP

BACKGROUND OF THE INVENTION

The invention is directed to a hydraulic motor-pump assembly of the type illustrated in U.S. Pat. No. 3,616,882 to Harvey Clinton White, assignor to TRW, Inc. the assignee of the present invention, the subject matter of which is hereby incorporated by reference.

Briefly, hydraulic motor-pump assemblies of the type here involved and as illustrated in the reference patent comprise a housing having a chamber formed therein in which a pair of gear members are disposed for relative rotational and orbital movement, forming expanding and contracting fluid pockets between the teeth thereof, and various fluid ports and passages for directing fluid under relatively high pressure through the housing and to and from the respective fluid pockets in synchronism with the relative movement of the gear members.

A work input-output shaft is provided which functions as an input shaft to which power is applied in the event the structure is employed as a pump, and which forms the output or drive shaft of the structure in the event it is employed as a hydraulic motor. Such shaft is suitably connected by a wobble shaft to one of the gear members for joint rotation therewith, and as a result of which the input-output shaft is subjected to operating forces tending to impart eccentric movement thereto.

As the shaft may be subjected to very high internal fluid pressures it is necessary to provide a suitable seal between the rotatable input-output shaft and the adjacent portion of the housing structure through which the shaft extends and as a result of the eccentric movement of the wobble shaft, the input-output shaft may be subjected to operating lateral forces tending to impart eccentric movement thereto, producing lateral forces on the seal, tending to extrude the same into any clearance gaps etc.

The primary sealing member must have suitable resiliency to provide adequate sealing engagement with the opposed faces of the shaft and housing between which the seal is to be effected, as well as to accommodate any lateral movement between such faces. At the same time the resilient sealing member must be retained in operative position even under the subjection of relatively high fluid pressures, as for example, on the order of 3000 psi. Consequently, it is necessary to back the resilient sealing member, at the low pressure side thereof, by means of a suitable structure capable of maintaining the sealing member in operative position. A problem immediately arises in this connection as it is necessary to provide suitable clearances between non-resilient, relatively rigid backing members and the opposed faces or walls of the shaft and housing. Clearances of the type referred to involve both clearances necessary to accommodate required tolerances in manufacture, as well as clearances necessary to accommodate any operational lateral movement between the shaft and housing. It will be appreciated that, under the high pressures to which the sealing member is subjected, such a member will readily tend to flow or extrude into any available clearance spaces of a size which will accommodate the same. This problem is further aggravated where the shaft may have imparted thereto the described lateral or eccentric movements, resulting in a more or less kneading action on the resilient member.

BRIEF SUMMARY OF THE INVENTION

The present invention is therefore directed to a hydraulic motor-pump assembly incorporating a novel sealing structure which overcomes the problems referred to, resulting in a very efficient seal with respect of the high fluid pressures involved and at the same time produce a seal which will have a relatively very long operational life, thereby enabling the production of a hydraulic motor-pump assembly of an extremely durable construction.

The desired results are accomplished in the present invention by the utilization of a relatively resilient sealing member in combination with a pair of relatively non-resilient annular backup members at the low pressured side of the seal, which members are so constructed that they cooperate in effectively supporting and retaining the resilient sealing member at the outer or low pressure face thereof, substantially throughout its radial area thereat, with clearances between the backup structure and the surfaces of the respective members in sealing engagement with the resilient sealing member, i.e. the shaft and housing, being reduced to substantially a bare minimum consistent with necessary manufacturing tolerances, and at the same time permitting the resilient member to accommodate any eccentric or lateral movement relative to the sealing member.

In the example of the invention illustrated one of the annular members has substantially a minimum clearance with respect to the sealing face of one of the members, for example the shaft, and the other of such annular members has substantially minimum clearance with respect to the adjacent sealing face of the other of the relatively movable members, for example, the housing with each of such annular members being provided with a clearance between it and the opposed wall of the other member sufficient to accommodate any such eccentric or lateral movement at the sealing member.

In the preferred form of the invention illustrated, the axially outermost annular member is provided with such a minimum clearance with respect to the rotatable shaft, and is constructed of a copper-tin alloy which is oil impregnated, while the other of such annular members is in the form of a relatively very thin annular shaped shim, for example having a thickness on the order of .01 inch and having a relatively minimum clearance between the outer edge of it and the adjacent opposed face of the relatively stationary part, i.e. the housing.

BRIEF DESCRIPTION OF THE DRAWINGS

In the drawings wherein like reference characters indicate like or corresponding parts.

DETAILED DESCRIPTION OF A PREFERRED EMBODIMENT

As fully described in the reference patent, a hydraulic motor-pump assembly of the type hereinvolved briefly comprises a housing having a chamber formed therein, a fluid inlet and a fluid outlet likewise being formed in the housing for directing fluid to and from the chamber. Disposed within the chamber is a gerotor gear set, including an internally toothed stator and an externally toothed rotor within the stator, which rotor has one tooth less than the stator, relative orbital and rotational movement between the stator and rotor forming expanding and contracting fluid pockets between the teeth thereof.

A work input-output shaft having a drive sleeve, at its inner end, is journaled in the housing on a bearing member for rotation of the shaft and sleeve on a fixed axis, which is operatively connected to the rotor by an intermediate wobble shaft, rotatable upon an axis intersecting the axis of the work input-output shaft at said drive sleeve, with such axis defining a conical surface of generation as the wobble shaft rotates, whereby such input-output shaft is subjected to operating forces tending to impart eccentric movement thereto.

Figure 1:
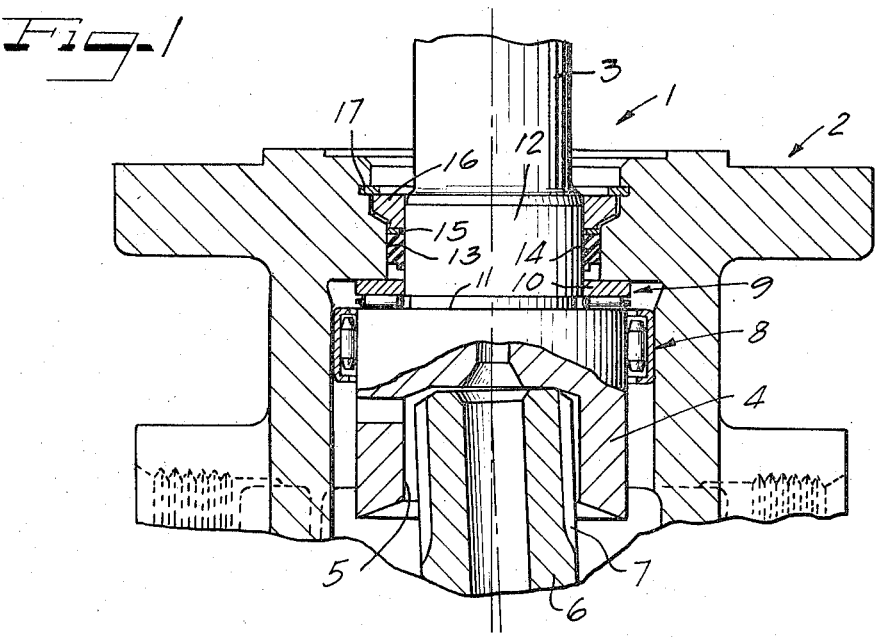
FIG. 1 is a longitudinal or axial sectional view through only a portion of the hydraulic power device such as illustrated in the reference patent.

Referring to FIG. 1 of the drawings, the reference numeral 1 designates generally a portion of a hydraulic power device comprising a relatively stationary housing indicated generally by the reference numeral 2 from which extends a rotatable shaft 3, which, depending upon the function of the hydraulic device as a driving motor or a driven fluid pump, may form the drive shaft of such a motor or the driven shaft of such a pump. As illustrated, the shaft 3 is in the form of a stub shaft having an enlarged inner end portion forming a drive sleeve 4, provided with an axially extending bore 5, in which is disposed the adjacent end of the wobble shaft 6, the latter being suitably connected to the sleeve 4 for the transmission of rotary motion therebetwen by suitable means, for example cooperable splines 7 formed respectively on the end of the shaft 6 and opposed side walls defining the bore 5, the construction being such that rotary motion is effectively transmitted from one shaft to the other but at the same time the shaft 6 may pivot with respect to the axis of the shaft 3, producing a wobbling or eccentric movement.

In the construction illustrated the shaft 3 is supported for rotary movement, relative to the housing 2, by a needle or roller bearing assembly, indicated generally by the numeral 8, with axisl thrust of the shaft 3, on the housing 2 being accommodated by a thrust bearing, illustrated as also being of needle type and indicated generally by the numeral 9, which includes a bearing race ring 10, abutting on an adjacent wall of the housing 2, with the respective needle bearing assembly 10 being seated on the annular face 11 of the sleeve 4.

The cylindrical sealing face 12 of the shaft 3 is disposed in opposed relation with respect to an opposed face or wall 13 of the concentric bore, cooperable to form an annular space therebetween which is spanned by a relatively resilient sealing ring 14.

The sealing ring 14, is backed at the low pressure side thereof by a pair of annular-shaped backing members 15 and 16, successively axially disposed, with the member 15 being positioned adjacent the outer face and thus at the low pressure side of the resilient sealing member 14. The member 16 is adapted to be retained in axially fixed relation with respect to outwardly directed forces thereon by a spring retaining washer 17.

Figure 2:
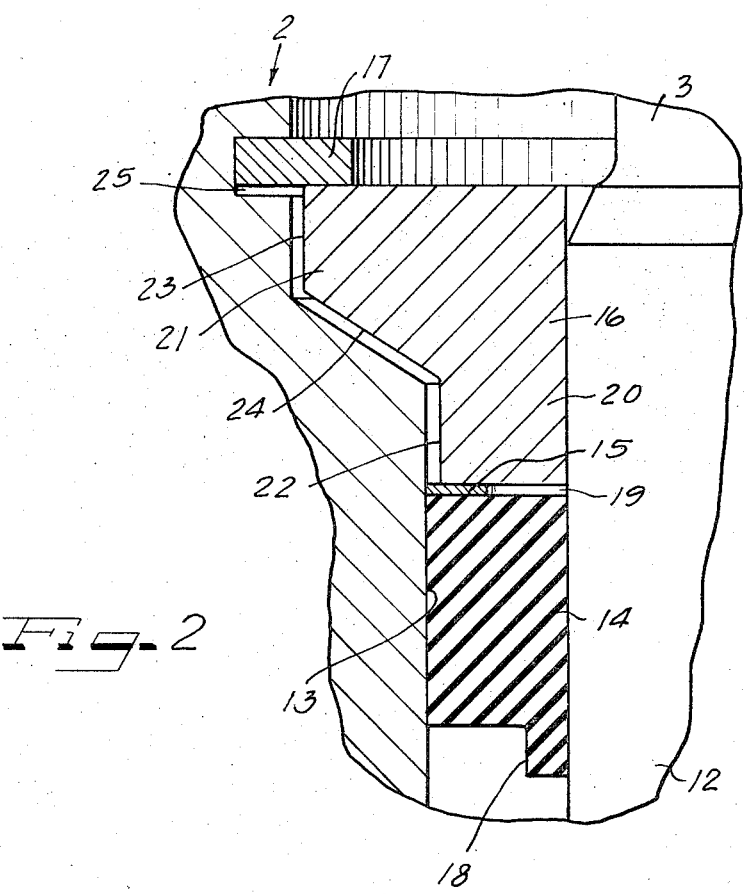
FIG. 2 is an enlarged sectional view through the sealing structure, illustrating details thereof.

As illustrated in greater detail in FIG. 2, the sealing member 14 is of generally rectangular configuration in transangular cross section and is provided at the fluid pressure side thereof with an axially inwardly directed shaft-engaging collar 18, integrally formed with the member 14, and in effect forming a sealing lip upon which the fluid pressure is acting on the circumferential face thereof in a radially inward direction toward the axis of the shaft 3, thus applying a sealing pressure thereon and forming an effective seal for the prevention of fluid flow between the resilient member and the shaft surface.

The outermost face of the sealing ring 14 bears on the adjacent face of the member 15, which, in the embodiment illustrated, is formed from very thin metal stock and thus may be termed a "shim member."

As will be apparent from reference to FIG. 2 the member 15 is provided with an outer diameter that substantially corresponds to the diameter of the bore 13, having only such clearance as necessary to accommodate manufacturing tolerances and insure proper cooperation with the member 16. It will be noted, however, that the inner diameter of the annular member 15 is considerably greater than the external diameter of the sealing face 12 of the shaft 3 to provide adequate clearance therebetween to accommodate any relative radial movement between the shaft 3, and the housing 2, without engagement of the shaft with the member 15.

The member 16 is provided with a generally L-shaped transverse cross section having a downwardly depending leg portion 20 and a radially outwardly extending leg portion 21 with the outer cylindrical faces 22 and 23 of the member 16 being connected by a generally conical wall 24 with the walls 22, 23, and 24 thus being generally complemental to the corresponding opposed walls of the housing 2. It will be noted, however, that the member 16 is provided with a minimum clearance between the radially inner face of the member and the adjacent surface of the shaft 3, again consistent with manufacturing tolerances and free rotation of the shaft 3 with respect to the member 16.

The retaining member 17 may be in the form of a radially split, spring washer of standard construction adapted to be circumferentially compressed, by means of a suitable tool, to enable its insertion into a retaining groove 25 formed in the adjacent wall of the member 2, with the inner portion of the retaining ring bearing on the outer face of the member 16, whereby the latter and thus the member 15, are retained in axially fixed positions when subjected to axially outward forces applied thereto as a result of the high fluid pressures acting on the sealing member 14.

I have found that an excellent composition for the ring 16, is an alloy comprising 95 percent copper and 5 percent tin, with the formed ring being impregnated with 30 SAE, MS oil.

It will be apparent from the above, that the backing structure for the resilient sealing ring 14, comprising the member 15 and 16, form an assembly which provides a support for the outer face of the sealing ring 14 substantially completely throughout the area thereof. In this connection it might be pointed out that while a clearance gap 19 is illustrated in FIG. 2 with respect to the inner periphery of the member 15, the latter is formed from relatively very thin metal and in actual practice the sealing member 14 would effectively completely fill up such gap. In other words, the members 15 and 16 cooperate to form a backing member which extends, for practical purposes, from the face of the bore 13, to the face of the shaft 19, with no material clearance that would permit a flow or extrusion of the material comprising the member 14, axially outward past the members 15, 16. As previously mentioned, the member 15 is formed from extremely thin material, the thickness of which will depend upon the maximum clearance between the outer periphery of the member 16, and the adjacent walls of the housing 2, such thickness being sufficient to prevent undue deformation of the outer peripheral portion of the member 15, under the high pressure forces applied to the sealing ring 14, whereby the member 15, will effectively prevent a flow or extrusion of the material of the ring 14, into the clearance space between the outer peripheral walls of the ring 16, and adjacent side walls formed by the housing 2, or between the latter and the shaft 3. In actual practice, where such clearance between the member 16, and the housing is on the order of .01 inches (plus or minus suitable manufacturing tolerances), a thickness of the member 15, on the order of .01 inches has been found adequate for the purposes, i.e. a thickness equal to or greater than said clearance.

It will be appreciated from the above description that I have provided a pump-motor assembly including a sealing structure effectively sealing the rotary input-output shaft subjected to forces thereon which may be reflected in lateral or eccentric movement thereof and exertion of radial'y directed forces on portions of the sealing assembly. However, the sealing structure of the invention may also provide a solution to high pressure sealing in other similar constructions, even where the operating shaft may not be subjected to comparable lateral forces, as for example, where for some particular reason normal clearances involved are such to create a flow or extrusion problem with respect to a resilient sealing member.

Having thus described my invention it is obvious that although minor modifications might be suggested by those versed in the art, it should be understood that I wish to embody within the scope of the patent warranted hereon all such modifications as reasonably and properly come within the scope of my contribution to the art.

I claim as my invention:

1. In a hydraulic power device having an input-output shaft subjected to operating forces tending to impart eccentric movement thereto with respect to a fluid seal subjected to relatively high fluid pressures, the combination of said shaft having a portion of relatively small diameter disposed in a relatively large-diameter bore, in a relatively stationary part of the device forming an annular space therebetween, a relatively resilient sealing ring spanning said annular space, a pair of axially successive annular members disposed at the low pressure side of said sealing ring, the outermost member of the pair having a relatively large radial clearance between it and the adjacent sidewall of said bore and a relatively small radial clearance between it and said shaft, the innermost member of the pair having a relatively small radial clearance between it and said bore and a relatively large clearance between it and said shaft, sufficient to accommodate any operational eccentric movement of said shaft without engagement therebetween, and means for retaining the outermost member of the pair in axially fixed relation with respect to outwardly directed forces applied thereto.

2. A device according to claim 1, wherein said innermost member is in the form of a shim member of relatively very thin stock.

3. A device according to claim 2, wherein said shim member has a thickness equal to or greater than the large radial clearance.

4. A device according to claim 1, wherein said sealing ring is provided with an axially inwardly directed shaft-engaging collar at the fluid pressire side of said sealing ring.

5. A device according to claim 1, wherein said outermost member is constructed of a copper-tin alloy, oil impregnated.

6. A device according to claim 1, wherein said retaining means comprises a split spring ring washer adapted to be seated in a cooperable annular groove in said stationary part.

7. A device according to claim 1, wherein the outer face of said outer member has a greater diameter than the inner face thereof and is disposed in a counterbore of greater diameter than said bore, said retaining means being disposed in said counterbore.

8. A device according to claim 7, wherein said retaining means comprises a split spring ring washer adapted to be seated in a cooperable annular groove disposed in said counterbore.

9. A device according to claim 7, wherein said counterbore is connected with said bore by an outwardly diverging wall of conical configuration, the edge walls of said outermost member having a configuration generally complemental to the sidewalls of said bore, counterbore and connecting wall.

10. A device according to claim 9, wherein said sealing ring is provided with an axially inwardly directed shaft-engaging collar at the fluid pressure side of said sealing ring.

11. A device according to claim 10, wherein said innermost member is in the form of a shim member of relatively very thin stock.

12. A device according to claim 11, wherein said shim member has a thickness equal to or greater than the large radial clearance.

13. A device according to claim 12, wherein said retaining means comprises a split spring ring washer adapted to be seated in a cooperable annular groove in said stationary part.

14. A device according to claim 13, wherein said outermost member is constructed of a copper-tin alloy, oil impregnated.

* * * * *